United States Patent
Konigsburg et al.

(10) Patent No.: US 9,069,563 B2
(45) Date of Patent: Jun. 30, 2015

(54) REDUCING STORE-HIT-LOADS IN AN OUT-OF-ORDER PROCESSOR

(75) Inventors: Brian R. Konigsburg, Austin, TX (US); David S. Levitan, Austin, TX (US); Brian R. Mestan, Austin, TX (US); David Mui, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 13/235,174

(22) Filed: Sep. 16, 2011

(65) Prior Publication Data

US 2013/0073833 A1 Mar. 21, 2013

(51) Int. Cl.
G06F 9/312 (2006.01)
G06F 9/38 (2006.01)

(52) U.S. Cl.
CPC ............ G06F 9/3834 (2013.01); G06F 9/3838 (2013.01)

(58) Field of Classification Search
CPC .............................. G06F 9/3838; G06F 9/3834
USPC ................................................. 712/217, 219
See application file for complete search history.

(56) References Cited

U.S. PATENT DOCUMENTS

| | | | | |
|---|---|---|---|---|
| 5,630,149 A * | 5/1997 | Bluhm | ............ | 712/217 |
| 6,021,485 A | 2/2000 | Feiste et al. | | |
| 7,181,544 B2 | 2/2007 | Vangal et al. | | |
| 2004/0044796 A1 | 3/2004 | Vangal et al. | | |
| 2005/0081017 A1 * | 4/2005 | Rupley et al. | ................. | 712/208 |
| 2006/0179227 A1 * | 8/2006 | Hrusecky et al. | ............. | 711/128 |
| 2007/0234018 A1 | 10/2007 | Feiste | | |
| 2009/0282202 A1 * | 11/2009 | Krimer et al. | ................. | 711/154 |
| 2010/0205384 A1 | 8/2010 | Beaumont-Smith et al. | | |
| 2011/0035564 A1 | 2/2011 | Krimer et al. | | |
| 2011/0153986 A1 * | 6/2011 | Alexander et al. | ............ | 712/205 |
| 2011/0185158 A1 | 7/2011 | Alexander et al. | | |

OTHER PUBLICATIONS

Moshovos et al. (Streamlining inter-operation memory communication via data dependence prediction. In Proceedings of the 30th Annual ACM/IEEE International Symposium on Microarchitecture, 1997).*
Tingting—et al.; "Scalable Store—Load Forwarding via Store Queue Index Prediction"; GOOGLE/IEEE; 2005.
U.K, Intellectual Property Office; Great Britain application GB1216172.5; International Search and Examination Report Under Sections 17 & 18(3) dated Jan. 8, 2013 (5 pg.).

* cited by examiner

*Primary Examiner* — Boris Gorney
*Assistant Examiner* — Yuqing Xiao
(74) *Attorney, Agent, or Firm* — Yudell Isidore PLLC; Matthew Baca

(57) ABSTRACT

A technique for reducing store-hit-loads in an out-of-order processor includes storing a store address of a store instruction associated with a store-hit-load (SHL) pipeline flush in an SHL entry. In response to detecting another SHL pipeline flush for the store address, a current count associated with the SHL entry is updated. In response to the current count associated with the SHL entry reaching a first terminal count, a dependency for the store instruction is created such that execution of a younger load instruction with a load address that overlaps the store address stalls until the store instruction executes.

20 Claims, 7 Drawing Sheets

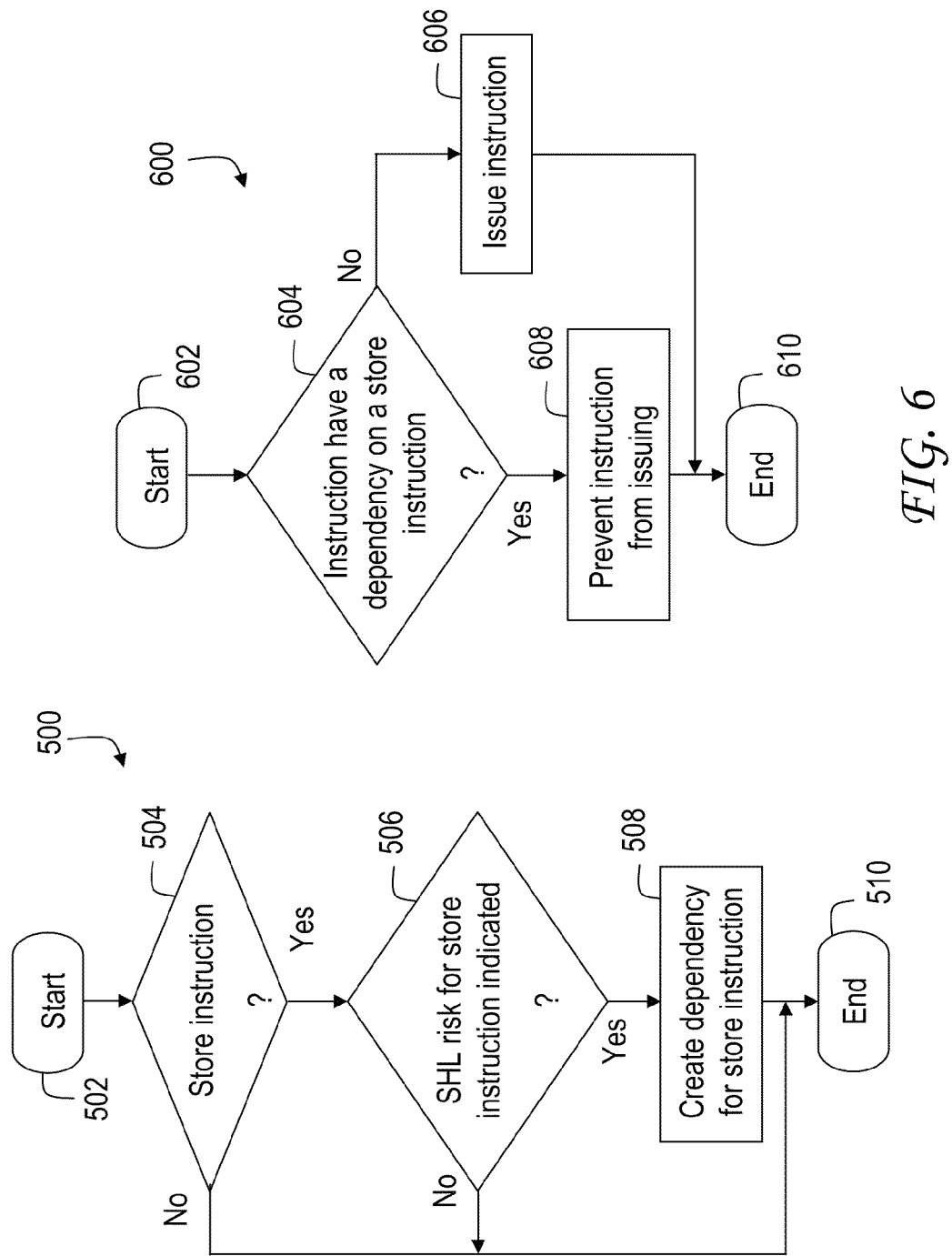

REDUCING STORE-HIT-LOADS IN AN OUT-OF-ORDER PROCESSOR

BACKGROUND

1. Field

This disclosure relates generally to an out-of-order processor and, more specifically, reducing store-hit-loads in an out-of-order processor.

2. Related Art

A processor that is capable of issuing and executing instructions out-of-order may permit load instructions to be executed ahead of store instructions. Assuming that a real address (RA) of a younger load instruction does not overlap with an RA of an older store instruction, out-of-order execution of the younger load instruction and the older store instruction may provide performance advantages. In a typical program, the likelihood that an RA of a younger load instruction overlaps with an RA of an older store instruction (that executes after the younger load instruction) is relatively low. As is known, a store violation condition (store-hit-load (SHL)) is indicated when an RA of a store instruction hits in a load reorder queue (LRQ) of a load store unit (LSU). That is, when an RA of a newly issued older store instruction matches an RA of a younger load instruction present in the LRQ of the LSU, an SHL is indicated. However, as detection of an SHL typically occurs late in an instruction execution pipeline, recovering from an SHL typically results in a relatively severe penalty on processor performance. For example, recovery from an SHL typically involves invalidating the younger load instruction that caused the SHL and reissuing the younger load instruction, as well as all instructions issued after the older store instruction.

A number of different approaches for addressing an SHL are known. For example, U.S. Pat. No. 5,666,506 (hereinafter "the '506 patent) discloses an apparatus that dynamically controls out-of-order execution of load instructions and store instructions by detecting an SHL and attempting to avoid the pipeline recovery process penalty. The apparatus of the '506 patent permits load and store instructions to issue and execute out-of-order by incorporating a unique store barrier cache that is used to dynamically predict whether or not an SHL is likely to occur. If an SHL is predicted, issuance of instructions to an LSU are restricted until the store instruction has been executed and it is once again safe to proceed with out-of-order execution. As another example, U.S. Pat. No. 5,781,752 (hereinafter "the '752 patent) discloses a predictor circuit that permits advanced execution of instructions (that depend on previous instructions for their data) by predicting dependencies based on previous mis-speculations detected at the final stages of processing. Synchronization of dependent instructions may be facilitated by a table that includes entries created for each instance of potential dependency.

SUMMARY

According to one aspect of the present disclosure, a technique for reducing store-hit-loads in an out-of-order processor includes storing a store address of a store instruction associated with a store-hit-load (SHL) pipeline flush in an SHL entry. In response to detecting another SHL pipeline flush for the store address, a current count associated with the SHL entry is updated. In response to the current count associated with the SHL entry reaching a first terminal count, a dependency for the store instruction is created such that execution of a younger load instruction with a load address that overlaps the store address stalls until the store instruction executes.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

FIG. 5 is a flowchart of an exemplary process employed by an instruction decode unit (IDU) configured according to another aspect of the present disclosure.

FIG. 6 is a flowchart of an exemplary process employed by an instruction issue unit (IIU) configured according to yet another aspect of the present disclosure.

DETAILED DESCRIPTION

Figure 1:
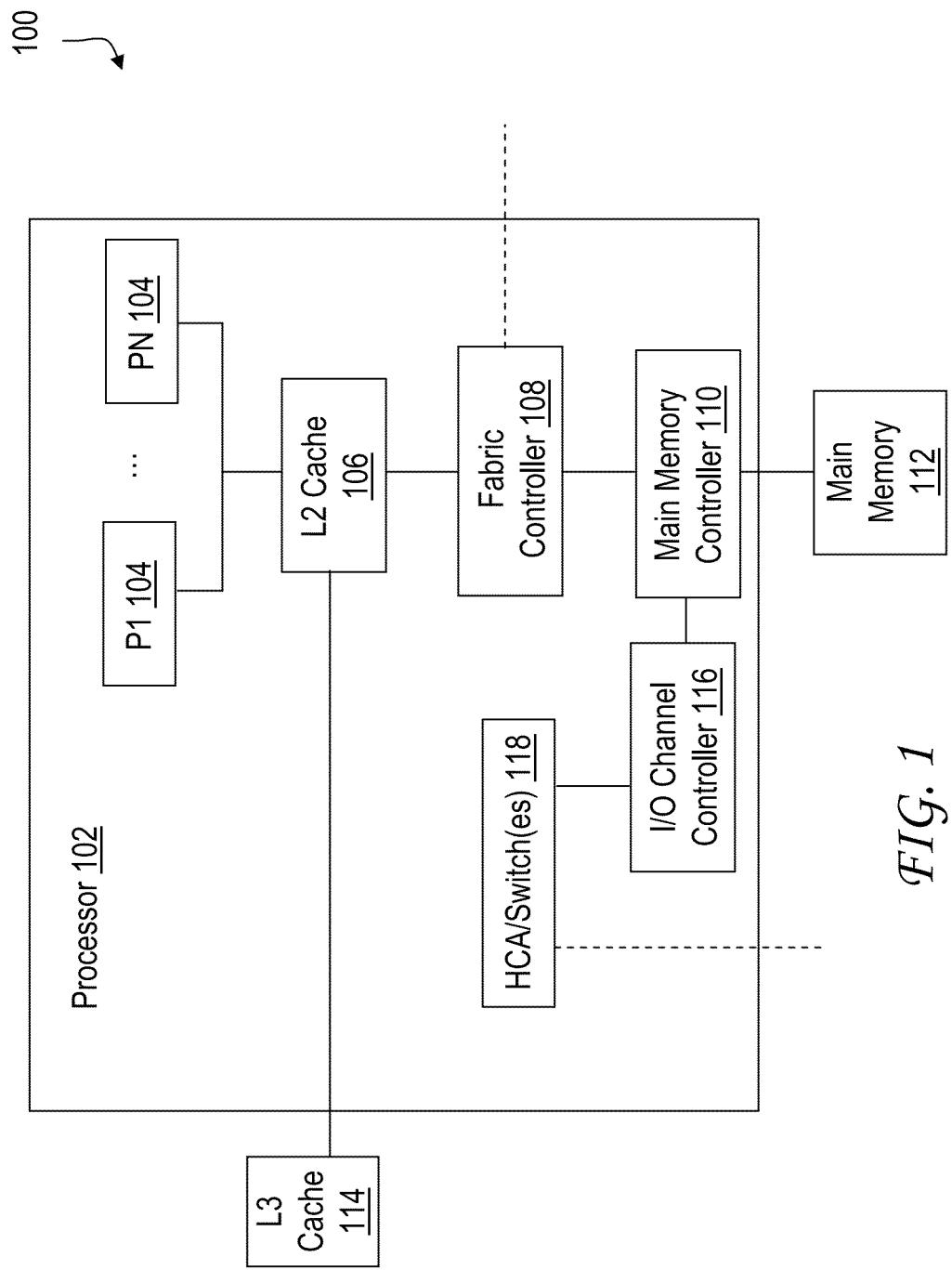
FIG. 1 is a diagram of a relevant portion of an exemplary processor system that is configured to reduce store-hit-loads (SHLs) according to various aspects of the present disclosure.

As will be appreciated by one of ordinary skill in the art, the present invention may be embodied as a method, system, device, or computer program product. Accordingly, the present invention may take the form of an embodiment including hardware, an embodiment including software (including firmware, resident software, microcode, etc.) or an embodiment combining software and hardware aspects that may all generally be referred to herein as a circuit, module, or system. The present invention may, for example, take the form of a computer program product on a computer-usable storage medium having computer-usable program code, e.g., in the form of one or more design files, embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or device. More specific examples (a non-exhaustive list) of the computer-readable storage medium include: a portable computer diskette, a hard disk, a random access memory (RAM), a read-only memory (ROM), an erasable programmable read-only memory (EPROM) or flash memory, a portable compact disc read-only memory (CD-ROM), an optical storage device, or a magnetic storage device. As used herein the term "coupled" includes a direct electrical connection between elements or blocks and an indirect electrical connection between elements or blocks achieved using one or more intervening elements or blocks.

As mentioned above, due to the out-of-order nature of modern processors, younger load instructions may be chosen for execution ahead of older store instructions to a same real address (RA). When a younger load instruction executes ahead of an older store instruction to the same RA, the younger load instruction returns stale data and instructions in a processor pipeline must be flushed from the pipeline and re-fetched to restore program consistency. Typically, it is desirable to delay a younger load instruction until an older store instruction to a same RA executes so that other independent instructions can execute and not be unnecessarily flushed from a processor pipeline. A step in reducing processor pipeline flushes due to execution of a younger load instruction before an older store instruction to a same RA is to identify a load/store sequence that is to the same RA and will be executed out-of-order such that a processor pipeline flush is required.

As noted above, the '752 patent discloses a predictor that receives a mis-speculation indication (from a data speculation circuit) and produces a prediction associated with a particular load instruction based on the mis-speculation indication. The '752 patent also discloses a prediction threshold detector that prevents data speculation for data consuming instructions (e.g., load instructions) having a prediction within a predetermined range. In contrast, the present disclosure implements a predictor that produces a prediction associated with data producing instructions (i.e., store instructions). Moreover, while the present disclosure implements a prediction threshold detector, data speculation is not prevented for store instructions having a prediction within a predetermined range. That is, according to the present disclosure, store instructions continue to execute despite being within a predetermined range and while certain data consuming instructions (e.g., load instructions) are prevented from data speculation, load instructions do not have an associated prediction.

As previously mentioned, the '506 patent discloses monitoring store instructions to determine, based on a prediction, whether an SHL is likely to occur. If an SHL is likely to occur, the issuance of certain load instructions is restricted until the store instruction executes and it is once again safe to proceed with out-of-order execution. The '506 patent also discloses restricting issuing all younger load instructions until the prediction is out of range. While the disclosed techniques monitor store instructions to determine, based on a prediction, whether an SHL is likely to occur (and, if so, restricts issuing data consuming instructions until the store instruction executes and it is once again safe to proceed with out-of-order execution), the disclosed techniques advantageously prevent execution of only those younger data consuming instructions that reference a same RA of memory as an older store instruction. For example, execution of only those younger data consuming instructions (e.g., load instructions) that reference a same RA of memory as an older store instruction may be accomplished by implementing a modified store instruction that implements a write to a base address of the older store instruction to establish a dependency of the younger data consuming instructions on the older store instruction.

In various embodiments, a processor configured in accordance with the present disclosure includes an instruction fetch unit (IFU) that is configured to maintain an SHL table (or other data structure) that stores effective addresses (EAs) associated with store instructions that have experienced an SHL flush. As is discussed in further detail below, an effective address tag (EATAG), received in a flush message from a load-store unit (LSU) of the processor, is used by the IFU to determine an EA of a store instruction associated with the flush message. The IFU stores an EA of the store instruction (indicated by the EATAG) in an entry of an SHL table (or updates a current count for the EA in the SHL table when the EA is already present in the SHL table) in response to receiving the flush message from the LSU. Alternatively, the SHL table may be located in a unit other than the IFU.

Following initial entry of an EA in the SHL table, a current count for the table entry is updated until a first terminal count is reached. For example, the current count may be incremented (or decremented) until the first terminal count is reached. In response to a terminal count being reached for an EA stored in the SHL table, the IFU provides an indication of an SHL risk to an instruction decode unit (IDU) of the processor the next time an instruction having the EA is fetched. When the IDU decodes a store instruction with an indication of an SHL risk, the IDU creates a dependency for the store instruction associated with the EA such that data consuming instructions having a matching EA are stalled (by an instruction issue unit (IIU) of the processor) until the store instruction executes. In another embodiment of the disclosure, where more than one register or constant is used to produce the EA, the IDU may create a dependency on one or more of the EA constituents to save area and/or timing. However, it should be appreciated that creating a dependency on one or more of the EA constituents prevents precisely identifying only instructions whose EA addresses match.

According to another aspect of the present disclosure, in the event that an SHL flush cannot be prevented, it may be desirable to discontinue trying to prevent the SHL flush (due to the fact that attempting to prevent the SHL flush only decreases processor performance more when the processor pipeline is flushed anyway). According to this aspect, when the current count reaches a second terminal count, the IFU does not provide an indication of an SHL risk to the IDU. In this case, the disclosed techniques for attempting to prevent the SHL flush are not implemented for subsequent store instructions with the matching EA.

A processor configured according to the present disclosure also includes an instruction dispatch unit that is configured to assign instruction tags (ITAGs), which indicate a program order of an instruction, to each instruction prior to dispatch. According to one or more embodiments, the LSU is configured to maintain a record of load instructions that have not been retired in a load reorder queue (LRQ) and determine that a conflicting younger load instruction (having an RA that overlaps with an RA of an older store instruction) will be executed prior to the older store instruction, based on respective ITAGs for the younger load instruction and the older store instruction and current processing of the younger load instruction when the older store instruction to a same RA is issued (by the IIU) to the LSU for processing. In subsequent iterations of an associated program, the IIU is configured to delay issuance of the younger load instruction (and other data consuming instructions) to the same RA until the older store instruction to the same RA executes. In response to retirement of a load instruction, the LSU is configured to remove the entry for the retired load instruction from the LRQ.

It should be appreciated that identifying a load/store sequence that is to the same RA and will be executed out-of-order minimizes false delays (i.e., delays associated with delaying a younger load instruction until execution of an older store instruction even though the younger load instruction and the older store instruction, while having the same EAs, map to RAs that do not overlap). It should also be appreciated that load instructions and store instructions may have different widths (i.e., load or store a different number of bytes). For example, load and store instructions may have a one byte width, a half-word width, a word width, a double-word width, or a quad word width. It should be appreciated that if any part of the source operand of a younger load instruction overlaps with destination operand of an older store instruction, the younger load instruction cannot be executed prior to the older store instruction while maintaining program consistency. In general, a beginning address and operand size of two instructions (i.e., a load instruction and a store instruction) determine whether the instructions' operands overlap.

With reference to FIG. 1, a relevant portion of an example processor system 100 is illustrated that is configured to reduce SHLs according to one or more of the techniques disclosed herein. Processor system 100 includes one or more chip-level multiprocessors (CMPs) 102 (only one of which is illustrated in FIG. 1), each of which may include multiple (e.g., two to one-hundred processor cores) processors 104 (labeled 'P1' through 'PN'). CMP 102 may correspond to, for example, a processor node of a computer cluster employed in a high performance computing (HPC) application. Processors 104 may, for example, operate in a simultaneous multithreading (SMT) mode or a single thread (ST) mode. When processors 104 operate in the SMT mode, processors 104 may employ multiple separate instruction fetch address registers to store program counters for multiple threads. In at least one embodiment, processors 104 each include a first level (L1) cache memory (not separately shown in FIG. 1, see FIG. 2) that is coupled to a shared second level (L2) cache memory (cache) 106, which is coupled to a shared third level (L3) cache 114, and a fabric controller 108.

As is illustrated, fabric controller 108 is coupled to a memory controller (e.g., included in a Northbridge) 110, which is coupled to a memory subsystem (main memory) 112. In alternative embodiments, fabric controller 108 may be omitted and, in this case, L2 cache 106 may be directly connected to main memory controller 110. Memory subsystem 112 includes an application appropriate amount of volatile and non-volatile memory. Fabric controller 108, when implemented, facilitates communication between different CMPs and between processors 104 and memory subsystem 112 and, in this manner, functions as an interface. It should be appreciated that the various techniques disclosed herein are equally applicable to systems that employ separate L2 caches for each processor, as well as systems that employ separate L2 and L3 caches for each processor. Each of the L1, L2, and L3 caches may be unified instruction and data caches or separate instruction and data caches.

As is also shown in FIG. 1, main memory controller 110 is also coupled to an I/O channel controller (e.g., included in a Southbridge) 116, which is coupled to a host channel adapter (HCA)/switch block 118. HCA/switch block 118 includes an HCA and one or more switches that may be utilized to couple processors 104 of CMP 102 to other nodes (e.g., I/O subsystem nodes and other processor nodes) of a computer cluster.

Figure 2:
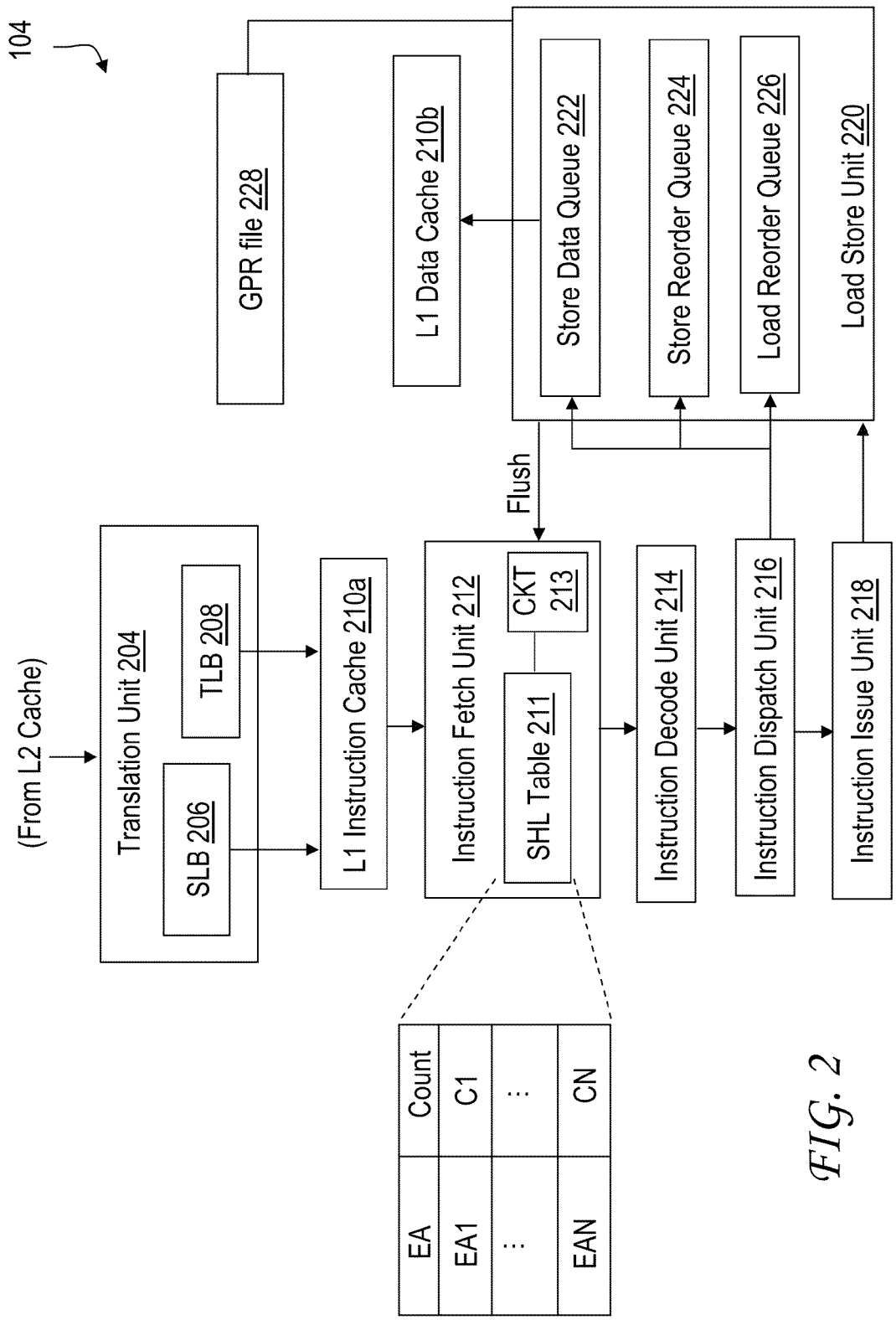
FIG. 2 is a diagram of a relevant portion of an exemplary processor that is employed in the processor system of FIG. 1, according to various embodiments of the present disclosure.

With reference to FIG. 2, a relevant portion of processor 104 is further illustrated. Processor 104 includes: a translation unit 204; an L1 instruction cache 210a; an L1 data cache 210b; an instruction fetch unit (IFU) 212; an instruction decode unit (IDU) 214; an instruction dispatch unit 216; an instruction issue unit (ITU) 218; and a load-store unit (LSU) 220, and a general purpose register file 228 that maintains general purpose registers (GPRs).

In at least some embodiments, processor 104 employs a virtualized memory system. Accordingly, programs written for native execution on processor 104 reference memory locations using effective addresses (EAs), while caches 210a, 210b, and 106 and main memory 112 are accessed utilizing real addresses (RAs). As such, address translation is required to convert the EAs (used by software) to RAs (used by hardware). In one or more embodiments, translation unit 204 (e.g., located between L2 cache 106 and L1 instruction cache 210a) includes a segment lookaside buffer (SLB) 206 (that includes a segment table) and a translation lookaside buffer (TLB) 208 (that includes a hashed page table). The segment table (not shown) and the hashed page table (not shown) are employed to translate EAs (used by software) into RAs (used by hardware) in order to locate instructions in L1 instruction cache 210a.

IFU 212 is configured to fetch instructions (for execution) from L1 instruction cache 210a. IFU 212 provides fetched instructions to IDU 214 for decoding. IDU 214 provides decoded instructions to instruction dispatch unit 216, which assigns instruction tags (ITAGs) to each instruction prior to dispatch to indicate a program order of an instruction. Instruction dispatch unit 216 then dispatches the decoded instructions to IIU 218, which may issue dispatched instructions out-of-order to LSU 220 (and other functional units that are not shown). LSU 220 includes a store data queue 222 (which queues store data for L1 data cache 210b), a store reorder queue 224, and a load reorder queue (LQR) 226. It should be appreciated that processor 104 may include various other functional units, e.g., fixed point units, floating point units, branch execution units, condition register execution units, additional LSUs, etc., depending on the application.

LSU 220 is configured to detect a store instruction that is associated with a store-hit-load (SHL) flush and send a flush message (that includes an appropriate EATAG) to IFU 212. LSU 220 maintains a record of load instructions that have not been retired in LRQ 226 and determines when a younger load instruction (having an RA that overlaps with an RA of an older store instruction) will be executed prior to the older store instruction, based on respective ITAGs for the younger load instruction and the older store instruction and current processing of the younger load instruction when the older store instruction to a same RA is issued (by IIU 218) to LSU 220 for processing. In subsequent iterations of an associated program, IIU 218 is configured to delay issuance of a younger load instruction (and other data consuming instructions) to the same RA until an older store instruction to the same RA executes. In response to retirement of a load instruction, LSU 220 removes an associated entry for the retired load instruction from LRQ 226.

When a flush message is sent by LSU 220 to IFU 212, an EA of an associated store instruction is determined (by IFU 212) based on an EATAG associated with the flush message. SHL table 211 is then searched (by circuit 213 of IFU 212) to determine whether the EA (as indicated by the EATAG) exists in SHL table 211. If the EA already exists in SHL table 211, an associated counter is updated (e.g., incremented or decremented) by circuit 213 of IFU 212. If the EA does not already exist in SHL table 211, the EA may be added in, for example, an empty entry in SHL table 211 or a used entry of SHL table 211. For example, when all entries in SHL table 211 are used, a least recently used (LRU) entry of SHL table 211 may be overwritten in SHL table 211 or an entry of SHL table 211 that has experienced a cache write to a same congruence class that has purged an associated store instruction may be overwritten.

When the EA (indicated by an EATAG in a flush message) matches an entry in SHL table 211 and a current count reaches a first terminal count, subsequent fetched instructions with the same EA are marked (by circuit 213 of IFU 212) as an SHL risk when IFU 212 provides the fetched instructions to IDU 214. For example, IFU 212 may mark a fetched instruction as an SHL risk by modifying one or more bits of the fetched instruction. When an instruction is marked as an SHL risk (by IFU 212) and IDU 214 decodes the instruction as a store instruction, an associated micro-operation is marked (by IDU 214) such that the store instruction becomes a store instruction with dependency.

For example, IDU 214 may set one or more bits of the associated micro-operation to indicate a base address field of the store instruction is being modified (written to) to set dependencies on the store instruction. In various embodiments, only non-microcoded, non-updated forms of store instructions are marked as store instructions with dependency. It should be appreciated that a store instruction with dependency requires subsequent readers (e.g., load instructions, logical instructions, and arithmetic instructions) of the base address field (as indicated in an associated general purpose register (GPR) of the store instruction) to be dependent. In one or more embodiments, a store instruction with dependency causes LSU 220 to write (following execution of the store instruction) a base address GPR with the base address+0 to clear the dependencies and allow the formerly dependent instructions to issue from IIU 218. The disclosed techniques are broadly applicable to SHLs where RAs of a younger load instruction and an older store instruction overlap.

Figure 3:
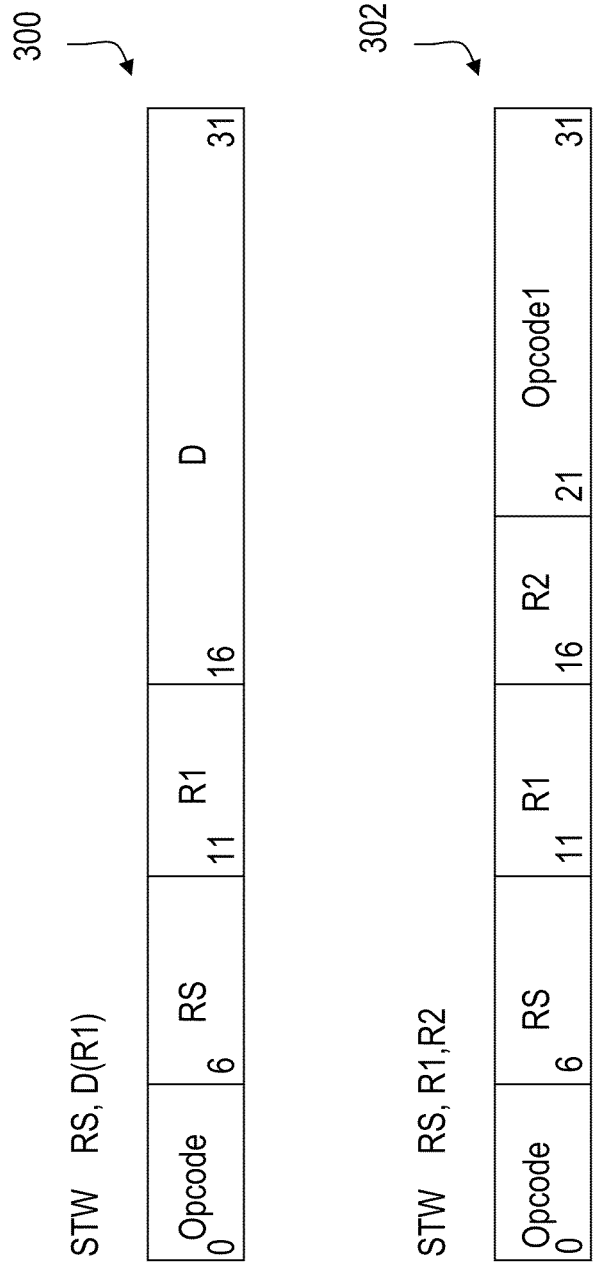
FIG. 3 is a diagram of exemplary store instructions configured according to aspects of the present disclosure.

A store (STW) instruction configured according to the present disclosure may take various forms, e.g., forms 300 and 302 shown in FIG. 3. A STW instruction with form 300 includes: an 'RS' field that specifies a source general purpose register (GPR) of stored data; a 'ID' field that specifies a 16-bit signed twos complement integer sign-extended to 32-bits for EA calculation; and a 'R1' field that specifies a source GPR for EA calculation. The STW instruction stores a word from GPR RS into a word of storage addressed by the EA. If GPR R1 is not 0, the EA is the sum of the contents of GPR R1 and D. If GPR R1 is 0, then the EA is D.

A STW instruction with form 302 includes: an 'RS' field that specifies a source GPR of stored data; an 'R2' field that specifies a value for EA calculation; and a 'R1' field that specifies a source GPR for EA calculation. The STW instruction stores a word from GPR RS into a word of storage addressed by the EA. If GPR R1 is not 0, the EA is the sum of the contents of GPR R1 and the value specified in the 'R2' field. If GPR R1 is 0, then the EA is the value specified in the 'R2' field.

Figure 4:
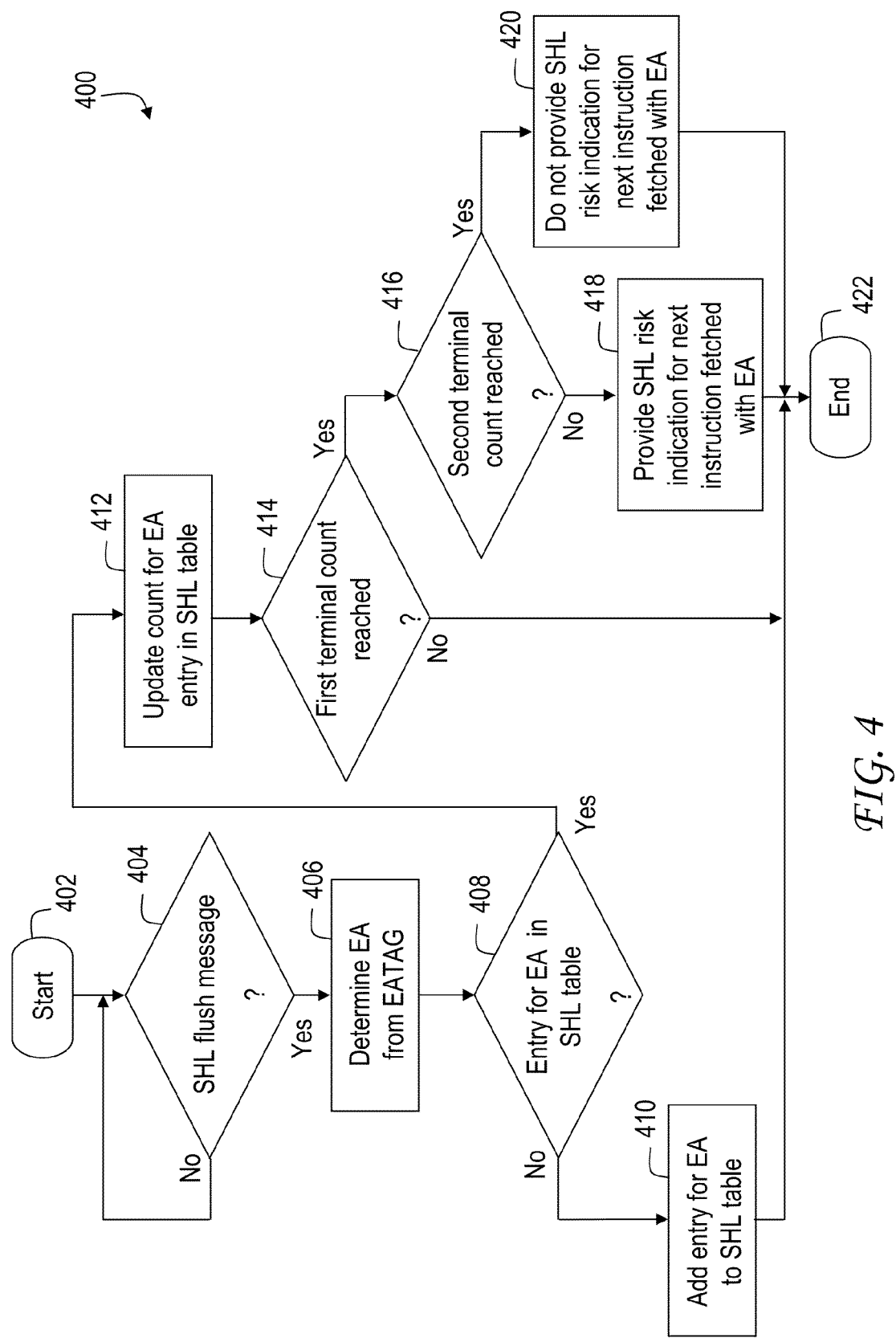
FIG. 4 is a flowchart of an exemplary process employed by an instruction fetch unit (IFU) configured according to one aspect of the present disclosure.

With reference to FIG. 4, a flowchart of an exemplary process 400, implemented by IFU 212 according to an embodiment of the present disclosure, is illustrated. In block 402 process 400 is initiated, at which point control transfers to decision block 404. In block 404, IFU 212 determines whether a flush message (i.e., a message to flush the processor pipeline due to an SHL) has been received from LSU 220. In response to a flush message not being received from LSU 220 in block 404, control loops on block 404. In response to a flush message being received from LSU 220 in block 404, control transfers to block 406. In block 406, IFU 212 determines an EA from an EATAG associated with the flush message.

Next, in decision block 408, IFU 212 determines whether an entry for the EA is in SHL table 211. In response to the entry for the EA not being in SHL table 211, control transfers to block 410. In block 410, IFU 212 adds the entry for the EA to SHL table 211, e.g., in an empty entry of SHL table 211. When SHL table 211 is full, IFU 212 may, for example, overwrite entries in SHL table 211 according to a least recently used (LRU) replacement approach. As another example, when SHL table 211 is full, IFU 212 may overwrite entries in SHL table 211 according to a congruence class replacement approach.

Following block 410, control transfers to block 422 where process 400 terminates until a next message is received. In response to the entry for the EA already being in SHL table 211 in block 408, control transfers to block 412. In block 412, IFU 212 updates a current count for the EA entry in SHL table 211. For example, when an EA for a received EATAG corresponds to EA entry 'EA1' in SHL table 211, IFU 212 may increment or decrement count 'C1'. Next, in decision block 414, IFU 212 determines whether a first terminal count is reached. For example, the first terminal count may be two. In the case where the first terminal count is two (and the current count is incremented and starts at zero), IFU 212 does not provide an indication of an SHL risk to IDU 214 until two SHLs have occurred for an EA. It should be appreciated that the first terminal count may be greater or less than two.

In response to the first terminal count not being reached in block 414, control transfers to block 422. In response to the first terminal count being reached in block 414, control transfers to decision block 416. In block 416, IFU 212 determines whether a second terminal count is reached. For example, the second terminal count may be seven. In the case where the second terminal count is seven (and the current count is incremented and starts at zero), IFU 212 does not discontinue providing indications of an SHL risk to IDU 214 until seven SHLs have occurred. In response to the second terminal count not being reached in block 416, control transfers to block 418, where IFU 212 provides an SHL risk indication to IDU 214 for a next instruction fetched with the EA. In response to the second terminal count being reached in block 416, control transfers to block 420, where IFU 212 discontinues providing an SHL risk indication to IDU 214 for subsequent instructions fetched with the EA. Following blocks 418 and 420 control transfers to block 422.

With reference to FIG. 5, a flowchart of an exemplary process 500, implemented by IDU 214 according to an embodiment of the present disclosure, is illustrated. In block 502 process 500 is initiated, at which point control transfers to decision block 504. In block 504, IDU 214 determines whether a store instruction has been received for decoding in an instruction group. In response to a store instruction not being received for decoding in block 504, control transfers to block 510, where process 500 ends until a next instruction (or group of instructions) is received by IDU 214 for decoding. In response to a store instruction being received for decoding in block 504, control transfers to decision block 506. In block 506, IDU 214 determines whether an SHL risk for the store instruction received for decoding is indicated (i.e., whether IFU 212 has indicated an SHL risk for the store instruction that is to be decoded). In response to IDU 214 determining an SHL risk for the store instruction (received for decoding) is not indicated in block 506, control transfers to block 510.

In response to IDU 214 determining an SHL risk for the store instruction (received for decoding) is indicated in block 506 (i.e., IFU 212 has indicated an SHL risk for the store instruction that is to be decoded by, for example, setting one or more designated instruction bits), control transfers to block 508. In block 508, IDU 214 creates a dependency for the store instruction by modifying the store instruction to a store instruction with dependency. For example, IDU 214 may set one or more bits of an associated micro-operation to indicate a base address field of the store instruction is being modified (written) to set dependencies on the store instruction. Following block 508, control transfers to block 510 where process 500 ends.

With reference to FIG. 6, a flowchart of an exemplary process 600, implemented by IIU 218 according to an embodiment of the present disclosure, is illustrated. In block 602 process 600 is initiated, at which point control transfers to decision block 604. In block 604, IIU 218 determines whether a received instruction has a dependency on a store instruction. As noted above, IDU 214 sets one or more bits of an associated micro-operation to indicate a base address field of the store instruction is being modified (written to) to set dependencies on the store instruction.

In response to the received instruction not having a dependency on a store instruction in block 604, control transfers to block 606. In block 606, IIU 218 issues the received instruction to LSU 220 (or another functional unit) for execution. Following block 606 control transfers to block 610, where process 600 ends until a next instruction (or group of instructions) is received by IIU 218 for issuance. In response to the received instruction having a dependency on a store instruction in block 604, control transfers to block 608. In block 608, IIU 218 stalls issuance of the received instruction to LSU 220 (or another functional unit) for execution until the store instruction on which the received instruction has a dependency completes execution (i.e., the hazard is cleared). Following block 608 control transfers to block 610.

Figure 7:
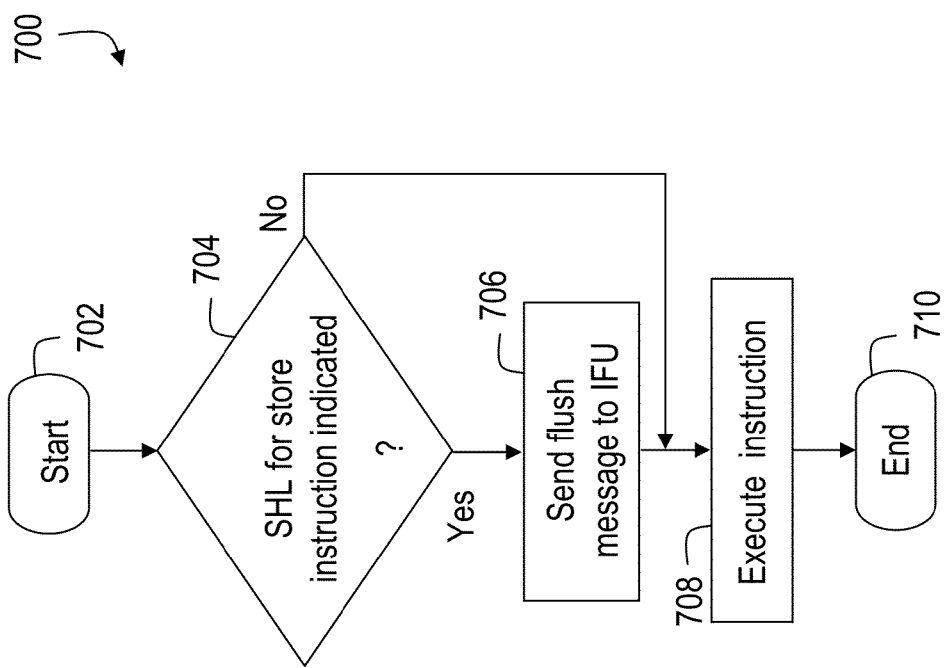
FIG. 7 is a flowchart of an exemplary process employed by a load-store unit (LSU) configured according to a different aspect of the present disclosure.

With reference to FIG. 7, a flowchart of an exemplary process 700, implemented by LSU 220 according to an embodiment of the present disclosure, is illustrated. In block 702 process 700 is initiated, at which point control transfers to decision block 704. In block 704, LSU 220 determines whether an SHL for a received store instruction is indicated. As noted above, LSU 220 is configured to maintain a record of load instructions that have not been retired in LRQ 226 and determine that a younger load instruction (having an RA that overlaps with an RA of an older store instruction) will be executed prior to the older store instruction. For example, LSU 220 may determine that a younger load instruction (having an RA that overlaps with an RA of an older store instruction) will be executed prior to the older store instruction based on respective ITAGs for the younger load instruction and the older store instruction and current processing stage of the younger load instruction when the older store instruction to a same RA is issued (by IIU 218) to LSU 220 for execution.

In response to an SHL for the store instruction not being indicated in block 704, control transfers to block 708. In block 708, the store instruction is executed by LSU 220. Following block 708, control transfers to block 710 where process 700 ends until another store instruction is received by LSU 220 for execution. In response to an SHL for the store instruction being indicated in block 704, control transfers to block 706. In block 706, LSU 220 sends a flush message to IFU 212. Next, control transfers to block 708 where the store instruction is executed by LSU 220. Process 700 then ends at block 710.

Figure 8:
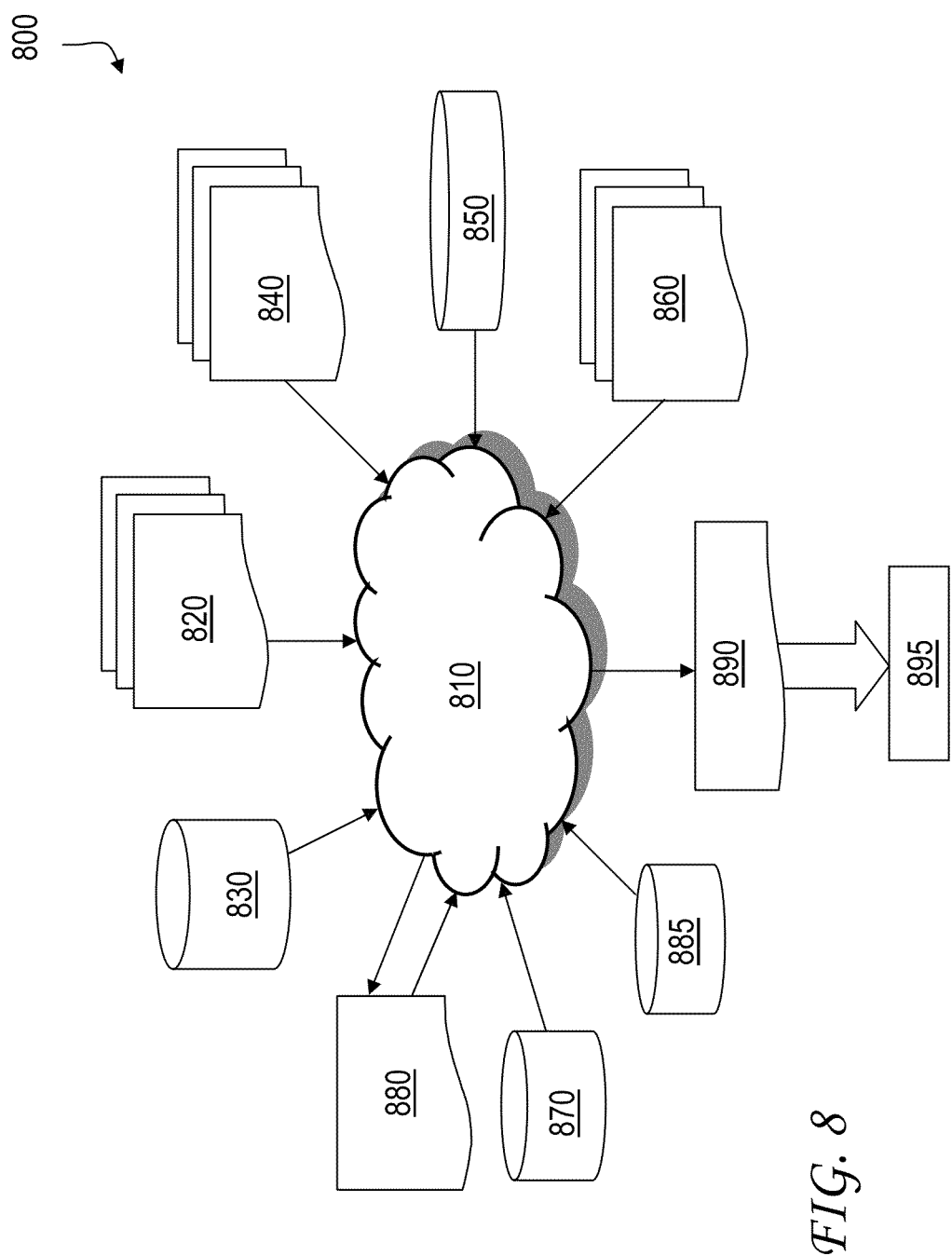
FIG. 8 is a flow diagram of a design process used in semiconductor design, manufacture, and/or test.

FIG. 8 shows a block diagram of an exemplary design flow 800 used for example, in semiconductor IC logic design, simulation, test, layout, and manufacture. Design flow 800 includes processes, machines and/or mechanisms for processing design structures or devices to generate logically or otherwise functionally equivalent representations of the design structures and/or devices described above and shown in FIGS. 1 and 2. The design structures processed and/or generated by design flow 800 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 800 may vary depending on the type of representation being designed. For example, a design flow 800 for building an application specific IC (ASIC) may differ from a design flow 800 for designing a standard component or from a design flow 800 for instantiating the design into a programmable array, for example a programmable gate array (PGA) or a field programmable gate array (FPGA) offered by Altera® Inc. or Xilinx® Inc.

FIG. 8 illustrates multiple such design structures including an input design structure 820 that is preferably processed by a design process 810. Design structure 820 may be a logical simulation design structure generated and processed by design process 810 to produce a logically equivalent functional representation of a hardware device. Design structure 820 may also or alternatively comprise data and/or program instructions that when processed by design process 810, generate a functional representation of the physical structure of a hardware device. Whether representing functional and/or structural design features, design structure 820 may be generated using electronic computer-aided design (ECAD) such as implemented by a core developer/designer. When encoded on a machine-readable data transmission, gate array, or storage medium, design structure 820 may be accessed and processed by one or more hardware and/or software modules within design process 810 to simulate or otherwise functionally represent an electronic component, circuit, electronic or logic module, apparatus, device, or system such as those shown in FIGS. 1 and 2. As such, design structure 820 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 810 preferably employs and incorporates hardware and/or software modules for synthesizing, translating, or otherwise processing a design/simulation functional equivalent of the components, circuits, devices, or logic structures shown in FIGS. 1 and 2 to generate a Netlist 880 which may contain design structures such as design structure 820. Netlist 880 may comprise, for example, compiled or otherwise processed data structures representing a list of wires, discrete components, logic gates, control circuits, I/O devices, models, etc. that describes the connections to other elements and circuits in an integrated circuit design. Netlist 880 may be synthesized using an iterative process in which netlist 880 is resynthesized one or more times depending on design specifications and parameters for the device. As with other design structure types described herein, netlist 880 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 810 may include hardware and software modules for processing a variety of input data structure types including Netlist 880. Such data structure types may reside, for example, within library elements 830 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 840, characterization data 850, verification data 860, design rules 870, and test data files 885 which may include input test patterns, output test results, and other testing information. Design process 810 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 810 without deviating from the scope and spirit of the invention. Design process 810 may also include modules for performing standard circuit design processes such as timing analysis, verification, design rule checking, place and route operations, etc.

Design process 810 employs and incorporates logic and physical design tools such as HDL compilers and simulation model build tools to process design structure 820 together with some or all of the depicted supporting data structures along with any additional mechanical design or data (if applicable), to generate a second design structure 890. Design structure 890 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 820, design structure 890 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1 and 2. In one embodiment, design structure 890 may comprise a compiled, executable HDL simulation model that functionally simulates the devices shown in FIGS. 1 and 2.

Design structure 890 may also employ a data format used for the exchange of layout data of integrated circuits and/or symbolic data format (e.g., information stored in a GDSII (GDS2), GL1, OASIS, map files, or any other suitable format for storing such design data structures). Design structure 890 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1 and 2. Design structure 890 may then proceed to a stage 895 where, for example, design structure 890: proceeds to tape-out, is released to manufacturing, is released to a mask house, is sent to another design house, is sent back to the customer, etc.

Accordingly, an out-of-order processor has been disclosed herein that is advantageously designed to reduce store-hit-loads.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," (and similar terms, such as includes, including, has, having, etc.) are open-ended when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for reducing store-hit-loads in an out-of-order processor, the method comprising:
   storing a store address of a store instruction associated with a store-hit-load (SHL) pipeline flush in an SHL entry;
   in response to detecting another SHL pipeline flush for the store address, incrementing a current count associated with the SHL entry;
   in response to the current count associated with the SHL entry reaching a first terminal count, creating a dependency for the store instruction such that execution of a younger load instruction with a load address that overlaps the store address stalls until the store instruction executes; and
   in response to the current count associated with the SHL entry reaching a second terminal count different from the first terminal count, removing the dependency for the store instruction such that execution of the younger load instruction does not stall;
wherein the current count starts at zero, wherein the first terminal count is greater than zero, and wherein the second terminal count is greater than the first terminal count.

2. The method of claim 1, further comprising:
overwriting SHL entries according to a least recently used replacement approach.

3. The method of claim 1, further comprising:
overwriting SHL entries according to a congruence class replacement approach.

4. The method of claim 1, wherein the store address is an effective address.

5. The method of claim 1, further comprising:
in response to the current count associated with the SHL entry reaching the first terminal count:
marking the store instruction and each subsequently fetched store instruction having the store address as an SHL risk; and
providing an SHL risk indication to an instruction dispatch unit for each subsequently fetched store instruction having the store address; and
in response to the current count associated with the SHL entry reaching the second terminal count, discontinuing providing the SHL risk indication to the instruction dispatch unit for each subsequently fetched store instruction having the store address.

6. The method of claim 1, further comprising:
modifying one or more bits of a micro-operation associated with the store instruction to create the dependency for the store instruction.

7. An out-of-order processor, comprising:
a load-store unit;
an instruction fetch unit coupled to the load-store unit, wherein the instruction fetch unit is configured to:
store a store address of a store instruction associated with a store-hit-load (SHL) pipeline flush in an SHL entry; and
in response to detecting another SHL pipeline flush for the store address, increment a current count associated with the SHL entry; and
an instruction decode unit coupled to the instruction fetch unit, wherein the instruction decode unit is configured to:
in response to the current count associated with the SHL entry reaching a first terminal count:
create a dependency for the store instruction such that execution of a younger load instruction with a load address that overlaps the store address stalls until the store instruction executes, wherein the instruction decode unit creates the dependency for the store instruction in response to the instruction fetch unit marking the store instruction as an SHL risk and the instruction fetch unit is further configured to:
in response to the current count associated with the SHL entry reaching a second terminal count different from the first terminal count, refrain from marking a subsequent fetched instruction with the store address as an SHL risk such that the instruction decode unit does not create a dependency for the store instruction and the execution of the younger load instruction does not stall;
wherein the current count starts at zero, wherein the first terminal count is greater than zero, and wherein the second terminal count is greater than the first terminal count.

8. The out-of-order processor of claim 7, wherein the instruction fetch unit is further configured to:
overwrite SHL entries according to a least recently used replacement approach.

9. The out-of-order processor of claim 7, wherein the instruction fetch unit is further configured to:
overwrite SHL entries according to a congruence class replacement approach.

10. The out-of-order processor of claim 7, wherein the store address is an effective address.

11. The out-of-order processor of claim 7, wherein the instruction fetch unit is further configured to:
in response to the current count associated with the SHL entry reaching a first terminal count:
mark the store instruction and each subsequently fetched store instruction having the store address as an SHL risk; and
provide an SHL risk indication to the instruction dispatch unit for each subsequently fetched store instruction having the store address.

12. The out-of-order processor of claim 11, wherein the instruction decode unit is further configured to:
decode the marked store instruction; and
in response to decoding the marked store instruction, modify one or more bits of a micro-operation associated with the marked store instruction to create the dependency for the marked store instruction.

13. An instruction fetch unit for an out-of-order processor, the instruction fetch unit comprising:
a circuit configured to:
store a store address of a store instruction associated with a store-hit-load (SHL) pipeline flush in an SHL entry of a SHL data structure;
in response to detecting a subsequent SHL pipeline flush for the store address, increment a current count associated with the SHL entry;
in response to the current count associated with the SHL entry reaching a first terminal count, mark each subsequently fetched instruction with the store address as an SHL risk to facilitate creation of a dependency for each subsequently fetched instruction with the store address by an instruction dispatch unit; and
in response to the current count associated with the SHL entry reaching a second terminal count different from the first terminal count, refrain from marking another subsequently fetched instruction with the store address as an SHL risk;
wherein the current count starts at zero, wherein the first terminal count is greater than zero, and wherein the second terminal count is greater than the first terminal count.

14. The instruction fetch unit of claim 13, wherein the instruction fetch unit is further configured to overwrite SHL entries in the SHL data structure according to a least recently used replacement approach.

15. The instruction fetch unit of claim 13, wherein the instruction fetch unit is further configured to overwrite SHL entries in the SHL data structure according to a congruence class replacement approach.

16. The instruction fetch unit of claim 13, wherein the store address is an effective address.

17. A non-transitory machine readable medium storing a design structure comprising:

a store-hit-load (SHL) data structure; and instructions that execute to implement functions of a hardware circuit coupled to the SHL data structure, wherein the circuit is configured to:

store a store address of a store instruction associated with an SHL pipeline flush in an SHL entry of the SHL data structure, wherein the store address is an effective address;

in response to detecting a subsequent SHL pipeline flush for the store address, increment a current count associated with the SHL entry;

in response to the current count associated with the SHL entry reaching a first terminal count, mark each subsequently fetched instruction with the store address as an SHL risk to facilitate creation of a dependency for each subsequently fetched instruction with the store address such that execution of a younger load instruction with a load address that overlaps the store address stalls until the store instruction executes; and in response to the current count associated with the SHL entry reaching a second terminal count different from the first terminal count, refrain from marking another subsequently fetched instruction with the store address as an SHL risk;

wherein the current count starts at zero, wherein the first terminal count is greater than zero, and wherein the second terminal count is greater than the first terminal count.

18. The method of claim 5, further comprising:

decoding, via the instruction dispatch unit, the marked store instruction; and in response to decoding the marked store instruction, marking, via the instruction dispatch unit, a micro-operation associated with the marked store instruction to indicate that the marked store instruction has the dependency.

19. The instruction fetch unit of claim 13, wherein the dependency for the store instruction causes execution of a younger load instruction with the load address that overlaps the store address to stall until the store instruction executes, and wherein in response to the instruction dispatch unit decoding the marked store instruction, the instruction dispatch unit marks a micro-operation associated with the marked store instruction to indicate that the marked store instruction has the dependency.

20. The design structure of claim 17, wherein the circuit is further configured to:

mark a micro-operation associated with the marked store instruction to indicate that the marked store instruction has the dependency, wherein marking the micro-operation further comprises modifying one or more bits of the micro-operation associated with the marked store instruction.

* * * * *